July 25, 1950  F. L. WETZEL ET AL  2,516,537
WHEEL BEARING
Filed Sept. 20, 1946  2 Sheets-Sheet 1
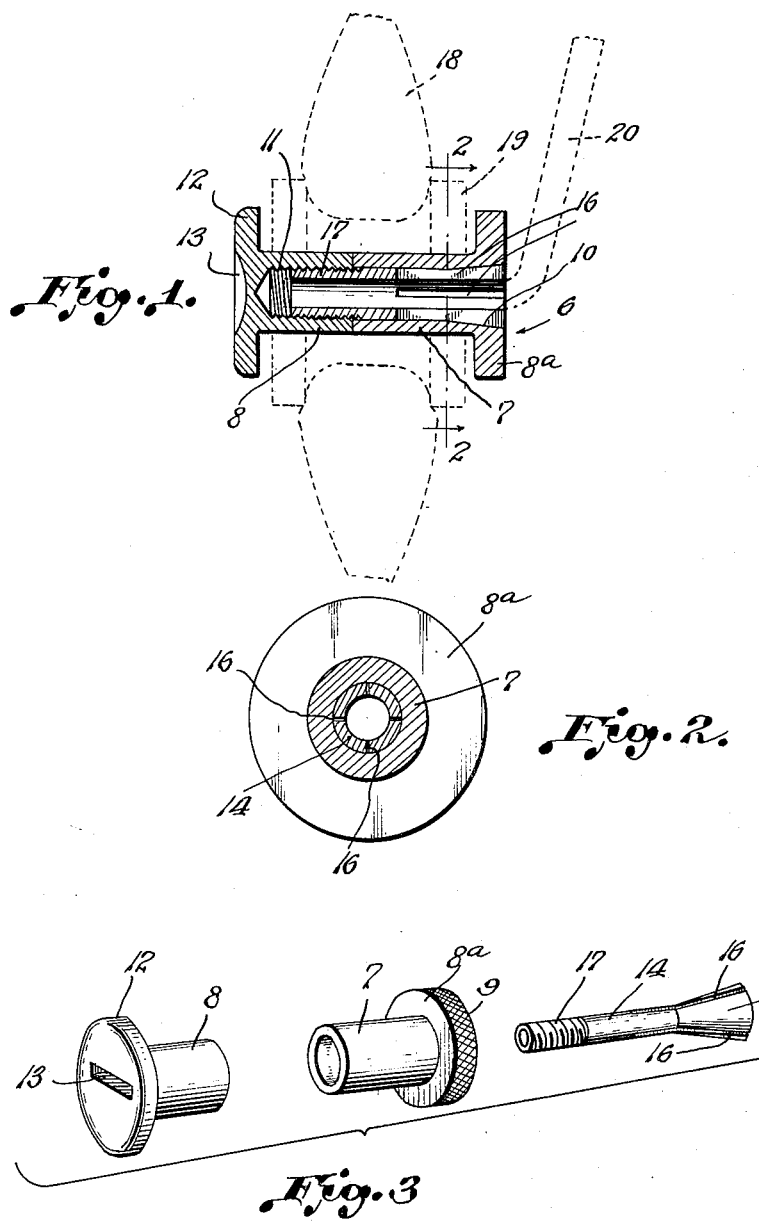
INVENTORS.
Frank L. Wetzel
BY William C. Wright
Geo. A. Tew
ATTORNEY.

July 25, 1950

F. L. WETZEL ET AL 2,516,537

WHEEL BEARING

Filed Sept. 20, 1946

INVENTORS.
Frank L. Wetzel
and William C. Wright.
BY
Geo. A. Tew
ATTORNEY.

Patented July 25, 1950

2,516,537

UNITED STATES PATENT OFFICE 2,516,537

WHEEL BEARING

Frank L. Wetzel and William C. Wright, Los Angeles, Calif.; said Wright assignor to said Wetzel Application September 20, 1946, Serial No. 698,260

8 Claims. (Cl. 308—36)

This invention relates to wheel bearings or like constructions designed for use for supporting the wheels of miniature airplanes, race cars, and all other wheeled toy vehicles.

The main object of the invention is to provide a bearing construction which can be easily and readily assembled and disassembled in an easy manner, simple enough for even a child to operate, whereby a toy wheel or the like can be mounted and dismounted when desired.

The invention is illustrated in the accompanying drawings in which:

Fig. 1 is a vertical sectional view, showing the wheel and airplane strut rod in dotted lines;

Fig. 2 is a section on the line 2—2 of Fig. 1;

Fig. 3 is an exploded view of the bearings and its various elements

Figure 4:
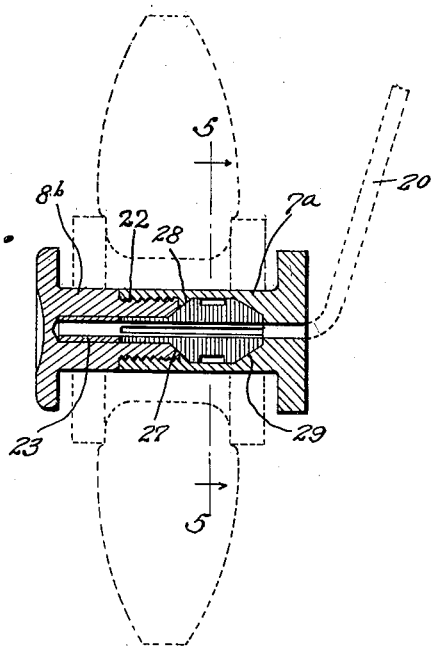
Fig. 4 is a vertical section of a modified form of the invention.
Figure 5:
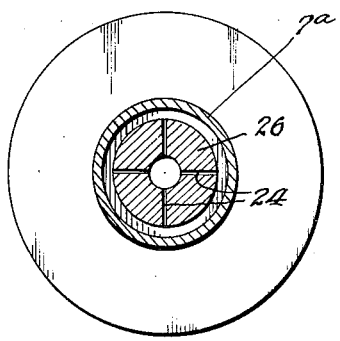
Fig. 5 is a section on the line 5—5 of Fig. 4.
Figure 6:
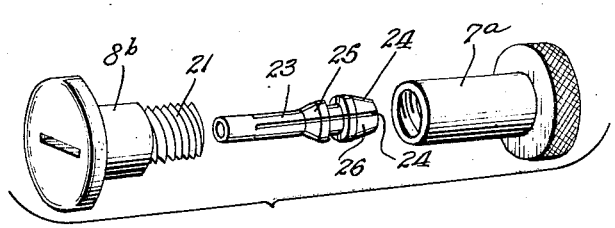
Fig. 6 is an exploded view of the modified form.

Referring specifically to the drawings in which like numerals refer to similar parts throughout the various views, the bearing is generally indicated at 6 and comprises two half portions 7 and 8, the part 7 consisting of a sleeve and terminating in an enlarged head 8a being knurled at 9, said part 7 being recessed, the recess being tapered as indicated at 10, for a purpose hereinafter to be described. The other portion or half 8 of the bearing is inwardly screw threaded as at 11 and terminates in an enlarged head 12 provided with a kerf 13, for the reception of a screw driver or other instrument for use when the bearing is being assembled or disassembled.

A split collet member 14 has an enlarged tapered head 15 diametrically slotted as at 16, the other end terminating in a screw thread part 17, which is adapted to be engaged by the thread 11 of the bearing portion 8 when the bearing is in assemble position.

In Fig. 1 the usual toy rubber wheel is shown in dotted lines 18, said wheel having a hub portion 19. 20 indicates the usual depending strut portion of an airplane landing gear, but it will of course be understood that the wheel and bearing construction could be readily mounted to an axle of a race car or the like.

In the use of the device the bearing and its collet member 14 is inserted into the recess of the bearing member 7, whereupon the wheel with its hub construction is placed upon the portion 7 after which the bearing part 8 is engaged with the threads of the collet. In this position the collet has not been tightened and as shown will accommodate the horizontal shaft of the strut 20. After this has been done the head portion 12 of the bearing part 8 is engaged in the kerf 13 as by a screw driver or the like, this causing the collet to move inwardly wherein its enlarged head portion 15 engages the tapered portion 10 to cause the jaws of the collet, due to the slots 16, to contract and tightly engage the axle or other part to which the wheel is to be fastened.

In disassembling the device the reverse operation is performed, that is, the bearing part 8 is unscrewed from the collet after which the bearing half 7 can be readily removed from the wheel hub, the collet slipped out, and the same easily removed from the axle.

The knurled part 9 of the bearing head 8a of the part 7 provides a better purchase on that part of the bearing when the portion 8 is being assembled and disassembled.

The modification is characterized by having the inner end portion of the half member 8b threaded as at 21, the half portion 7a being internally threaded as indicated at 22. The collet member 23 in the modification is provided with diametrically opposed slots 24. Said collet is provided with two oppositely spaced apart tapered or beveled surfaces 25 and 26, said tapered or beveled surfaces cooperating respectively with a tapered surface 27 provided on the outer end of the outer half member 8b. The half member 7a also is provided with a tapered portion 28 engaging said beveled portion 25, the half portion 7a also being provided with a reduced or beveled part 29 which engages the portion 26 of the collet when the two half portions are drawn together as by screw and thread members 21 and 22, thereby causing the collet to contract and engaging the end of the strut rod 20.

It will thus be seen that I have provided a bearing which is extremely cheap of manufacture and extremely simple in parts and operation and one that can be readily assembled and disassembled within a very short space of time in the operation of mounting and dismounting a wheel.

The invention is not intended to be limited to the exact construction disclosed, but is capable of variation and modification within the scope of the following claims.

We claim:

1. A bearing support for a toy wheel consisting of two substantially identical half members and a collet, said collet being tapered at one end and screw threaded at its other end, and a means on the two half members for closing said collet about an axle, said means consisting of inner threads on one of the bearing halves engaging the threads on the collet and a tapered recess adjacent the head of the other bearing half engaging the tapered head of the collet when the bearing halves are drawn together.

2. A wheel bearing comprising cooperating half members forming a bearing, a collet, the half members consisting of sleeved members, one of the half members being threaded internally and terminating in an enlarged head, a kerf in said head, the other half member terminating in an enlarged knurled head and tapered internally adjacent its outer portion, said collet threaded at one end and having a slotted tapered head at its other end, whereby the collet grips an axle or the like when the half members are drawn together.

3. A wheel bearing comprising cooperating half portions, a collet, having a plurality of beveled faces and means internally of the half portions for engaging the beveled faces and contracting the collet.

4. A wheel bearing comprising cooperating half portions, a collet, said half portions having recesses to receive said collet, one end of the collet abutting the inner head of one of the half portions, an intermediate beveled face on the collet engaged by a tapered portion of each of the half portions, and a beveled face at the end of the collet engaging a beveled portion of the inner half portion.

5. A bearing for a wheel or the like, said bearing being vertically divided to form two substantially identical half members, which when assembled form a bearing for a wheel, one of said bearing half members having screw threads on its inner surface, the other of said half member being tapered on its inner surface adjacent its outer side, and a split collet having threads on one end and an enlarged tapered head on its other end, the threads on the collet adapted to engage the threaded portion of the bearing half, the tapered head of the collet engaging the tapered surface of the other bearing half, head members formed at each side of the bearing half members, whereby turning of the half member containing the threads draws the collet inwardly to engage the same with an axle or the like to mount the bearing thereon.

6. A bearing for a wheel or the like consisting of two substantially identical half members each provided with an enlarged head, an axle gripping collet, one of the half members being internally threaded and the other half member being tapered on its inner surface adjacent its head portion, said collet having a tapered head portion and a threaded portion, the threads of the threaded half member engaging the threads of the collet and the tapered head of the collet engaging the tapered portion of the other half member when the two half members are assembled to form a bearing support, the assembling of the two half members causing the collet to grip an axle or the like which has been placed within the collet.

7. A bearing for a wheel or the like, said bearing consisting of two substantially identical half members having longitudinal recesses therein, said members each having an enlarged head, a split collet having a tapered head and longitudinally bored to receive an axle, said collet fitting within the recesses of the bearing halves, one of the half members having a tapered portion along the recess formed therein, said tapered portion engaging the tapered portion of the collet when the bearing halves are moved into assembled relation to cause the collet to grip an axle placed therein while the outer surfaces of the halves form an unbroken bearing surface.

8. The combination recited in claim 7, one of the bearing halves having threads formed on a portion thereof, the other bearing half having threads formed adjacent its inner end and along the longitudinal recess the threads being engaged when the half members are moved to assembled relation.

FRANK L. WETZEL.
WILLIAM C. WRIGHT.

REFERENCES CITED

The following references are of record in the file of this patent:

UNITED STATES PATENTS

| Number | Name | Date |
| --- | --- | --- |
| 123,413 | Newell | Feb. 6, 1872 |
| 644,164 | Foskett | Feb. 27, 1900 |
| 648,177 | Paleck et al. | Apr. 24, 1900 |
| 952,149 | Smith et al. | Mar. 15, 1910 |
| 1,086,393 | Moseley | Feb. 10, 1914 |
| 1,393,261 | Casey | Oct. 11, 1921 |